(12) United States Patent
Harada et al.

(10) Patent No.: US 6,439,597 B1
(45) Date of Patent: Aug. 27, 2002

(54) SEAT PROVIDED WITH SIDE AIR BAG SYSTEM

(75) Inventors: Masami Harada; Yosuke Higashi; Jinichi Tanabe, all of Tochigi-Ken (JP)

(73) Assignee: TS Tech Co., Ltd. (JP)

( * ) Notice: Subject to any disclaimer, the term of this patent is extended or adjusted under 35 U.S.C. 154(b) by 0 days.

(21) Appl. No.: 09/557,362

(22) Filed: Apr. 25, 2000

(30) Foreign Application Priority Data

| | | |
|---|---|---|
| Apr. 30, 1999 | (JP) | 11-123656 |
| Jun. 24, 1999 | (JP) | 11-178305 |
| Apr. 6, 2000 | (JP) | 2000-104384 |

(51) Int. Cl.[7] ............................................. B60R 21/20
(52) U.S. Cl. ............................. 280/728.2; 280/730.2; 297/216.13
(58) Field of Search .................. 297/216.13; 280/730.1, 280/730.2, 728.2

(56) References Cited

U.S. PATENT DOCUMENTS

| | | | | |
|---|---|---|---|---|
| 5,749,597 A | * | 5/1998 | Saderholm | 280/730.2 |
| 5,762,363 A | * | 6/1998 | Brown et al. | 280/730.2 |
| 5,845,930 A | * | 12/1998 | Maly et al. | 280/730.2 |
| 5,967,546 A | * | 10/1999 | Homier et al. | 280/730.2 |
| 6,045,151 A | * | 4/2000 | Wu | 297/216.13 |

FOREIGN PATENT DOCUMENTS

| | | |
|---|---|---|
| JP | 1178762 | 3/1999 |

* cited by examiner

*Primary Examiner*—Peter R. Brown
(74) *Attorney, Agent, or Firm*—Dann, Dorfman, Herrell and Skillman, P.C.

(57) ABSTRACT

In a seat with a side air bag system, of two stay clothes (9, 10) continuously extending from a sewing portion corresponding to a breaking portion (8, 80) of a trim cover (7), one stay cloth (9) is taken into a cavity (3) from an opening edge of a back pad (2), the other stay cloth (10) is taken into the cavity (3) of the back pad (2) from a front side of an air bag system (1) so as to wrap the air bag system (1) with two stay clothes (9, 10), the stay clothes (9, 10) are connected and supported by wear plates (11, 12, 110) gripping and fixing a take-in end of each of the stay clothes (9, 10) between the air bag system (1) and the side plate (6). Accordingly, each of the stay clothes (9, 10) can be easily assembled and the air bag system (1) can be directly wrapped with two stay clothes so as to efficiently concentrate an inflating pressure of the air bag on the sewing portion corresponding to the breaking portion (8, 80) of the trim cover (7), thereby quickly inflating and developing the air bag.

8 Claims, 11 Drawing Sheets

SEAT PROVIDED WITH SIDE AIR BAG SYSTEM

BACKGROUND OF THE INVENTION

1. Field of the invention

The present invention relates to an improvement of a seat with a side air bag system in which an air bag system installing an air bag capable of inflating and developing outward due to a gas pressure is provided in a side portion of a seat back.

2. Description of the Related Art

Conventionally, as a seat with a side air bag system, there has been proposed the seat provided with the side air bag system in which a trim cover is sewed so as to form a bag shape, a breaking portion of the trim cover is formed at a sewing portion between a front surface cover portion and a side surface cover portion, two stay clothes are sewed to the sewing portion corresponding to the breaking portion of the trim cover at one end portion so as to be provided inside the trim cover, and the air bag system is wrapped with the stay clothes so as to be mounted and installed in a side plate of a seat back frame (Japanese Patent Application Laid-Open No. 11-78762).

In the seat provided with the side air bag system, it is preferable that, since an inflating pressure of the air bag can be concentrated on the sewing portion corresponding to the breaking portion of the trim cover by the stay clothes so as to easily break the sewing portion, thereby securely inflating and developing the air bag and an inflating balance and a developing directionality of the air bag can be stably defined.

In the seat provided with the side air bag system, it is necessary that the stay clothes are assembled so as to easily wrap the air bag system and are provided in such a manner as to wrap the air bag system and effectively concentrate the inflating pressure of the air bag on the sewing portion corresponding to the breaking portion of the trim cover, thereby securely inflating and developing the air bag.

Accordingly, an object of the present invention is to provide a seat with a side air bag system in which stay clothes are easily assembled so as to wrap an air bag system and the stay clothes are provided in such a manner as to wrap the air bag system and concentrate an inflating pressure of the air bag on a sewing portion corresponding to a breaking portion of a trim cover, thereby quickly inflating and developing an air bag.

SUMMARY OF THE INVENTION

In accordance with a main feature of the present invention, there is provided a seat provided with a side air bag comprising:

an air bag system installed so as to be capable of inflating and developing outward due to a gas pressure, and being positioned within a cavity provided in a side portion of a back pad so as to be mounted to a side plate of a seat back frame;

a sewing portion of a trim cover covering a provision side of the air bag system, the sewing portion forming a breaking portion of the trim cover according to an inflation and development of the air bag; and two stay clothes sewed to the sewing portion corresponding to the breaking portion of the trim cover at one end portion thereof so as to wrap the air bag system, the stay clothes being provided inside the trim cover, wherein one stay cloth is taken into the cavity from an opening edge of a back pad, the other stay cloth is taken into the cavity of the back pad from a front side of the air bag system so as to fasten a roll-in end in the rear side of the back pad, and the air bag system is wrapped with two stay clothes. Accordingly, since each of the stay clothes can be easily assembled and the air bag system can be wrapped with two stay clothes, the structure can be made such that the inflating pressure of the air bag can be effectively concentrated on the sewing portion corresponding to the breaking portion of the trim cover, thereby quickly inflating and developing the air bag.

The other features will be apparent from a mode of an embodiment for carrying out the invention mentioned below.

DETAILED DESCRIPTION OF THE PREFERRED EMBODIMENTS

Figure 1:
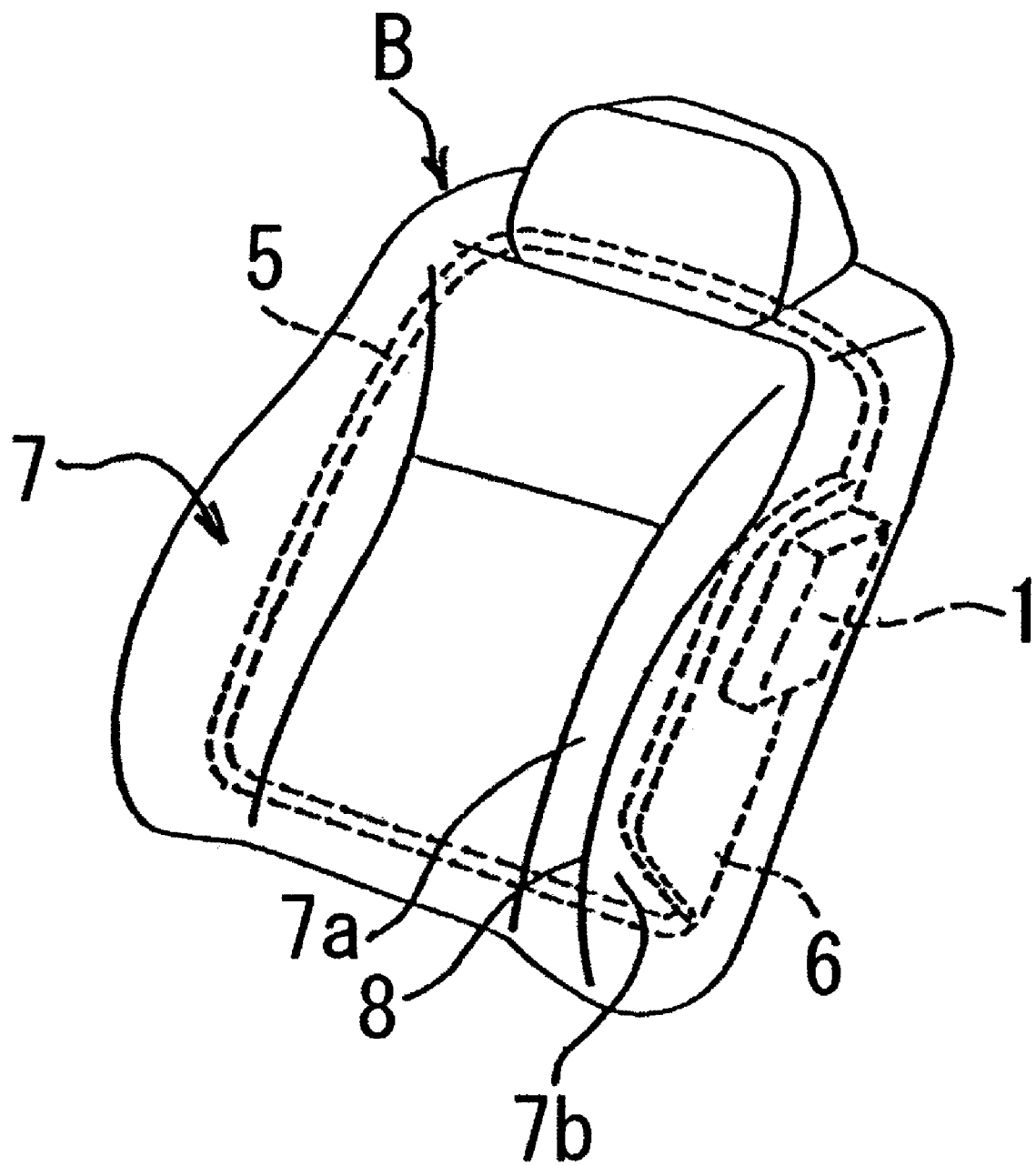
FIG. 1 is a perspective view showing a seat back of a seat with a side air bag system according to the present invention.

A description will be given below of an embodiment with reference to the accompanying drawings. FIG. 1 shows a seat back B of a passenger seat in which an air bag system 1 is accommodated and provided in a right side portion as seen from a right side of a vehicle. In this seat back B, there is provided the air bag system 1 accommodating an inflator and an air bag which are not particularly illustrated within an air bag case which can be opened due to an inflating pressure of the air bag and connected to an impact sensor provided in a side of a vehicle by a circuit.

Figure 2:
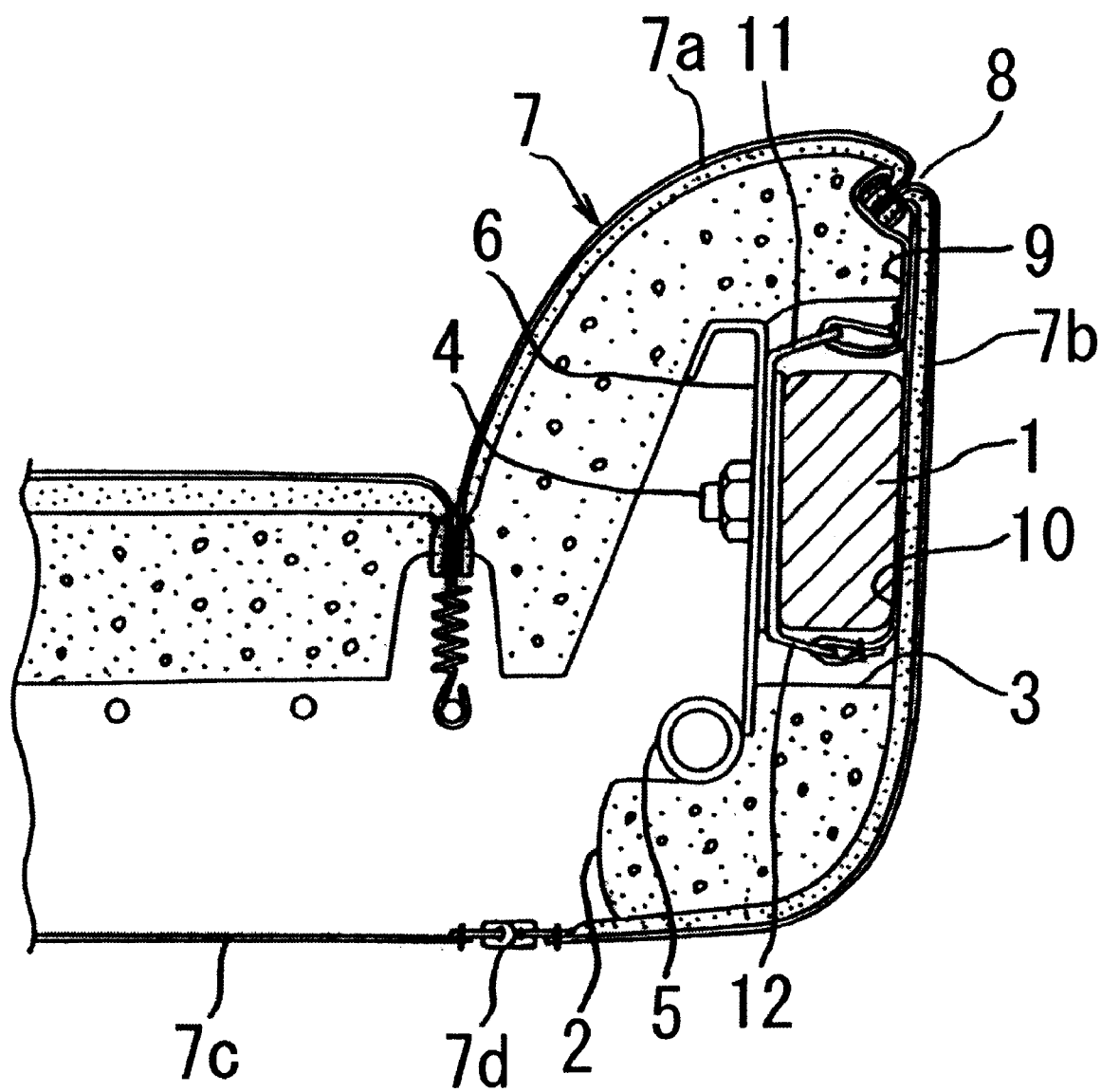
FIG. 2 is a cross sectional view showing a side portion of a seat back which is assembled including a wear plate for connecting a stay cloth according to a first embodiment as a seat with a side air bag system of the present invention.

The air bag system 1 is accommodated and positioned in a cavity 3 provided in a side portion of a back pad 2 as shown in FIG. 2, is mounted and fixed to a side plate 6 of a seat back frame 5 by two fastening bolts 4 (only one of them is illustrated) protruding from an air bag case, and is installed in an inner portion of the seat back B by covering the whole back pad 2 including the cavity 3 with a trim cover 7.

The trim cover 7 can be formed by employing a single material such as a leather, a synthetic leather, a fabric or the like or a wadding cover integrally laminated by a surface material, a wadding material and a backing material. The trim cover 7 corresponds to the seat back B having a bank portion, and is formed in a bag shape by sewing a front surface cover portion 7a covering right and left bank surfaces from a center of a seat surface and a side surface cover portion 7b extending from a peripheral side surface to a back surface and foldably mounting a back surface cover portion 7c to a slide fastener 7d.

In the trim cover 7, a breaking portion 8 broken according to an inflation and a development of the air bag is formed from a sewing portion between the front surface cover portion 7a covering the right and left bank surfaces from the center of the seat surface and the side surface cover portion 7b extending from the peripheral side surface to the back surface. The sewing portion corresponding to the breaking portion 8 can be sewed so as to be easily broken due to a stress generated by the inflation of the air bag while keeping a strength sufficient to resist against a normal use by sewing about No. 8 count yarn and about No. 20 count yarn as vertical sewing yarns.

Figure 3:
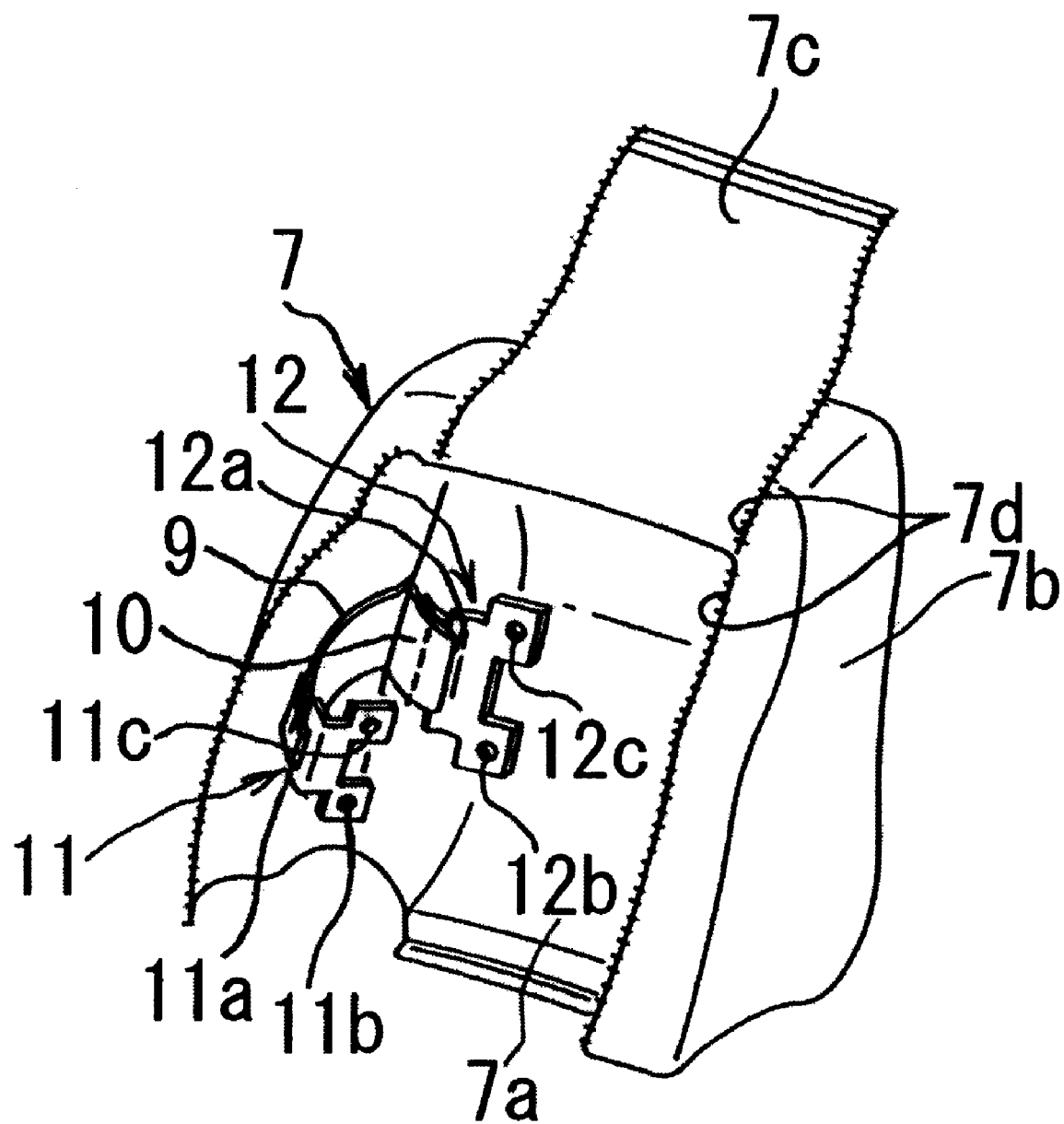
FIG. 3 is a perspective view showing a back side of a trim cover for the seat back shown in FIG. 2.
Figure 4:
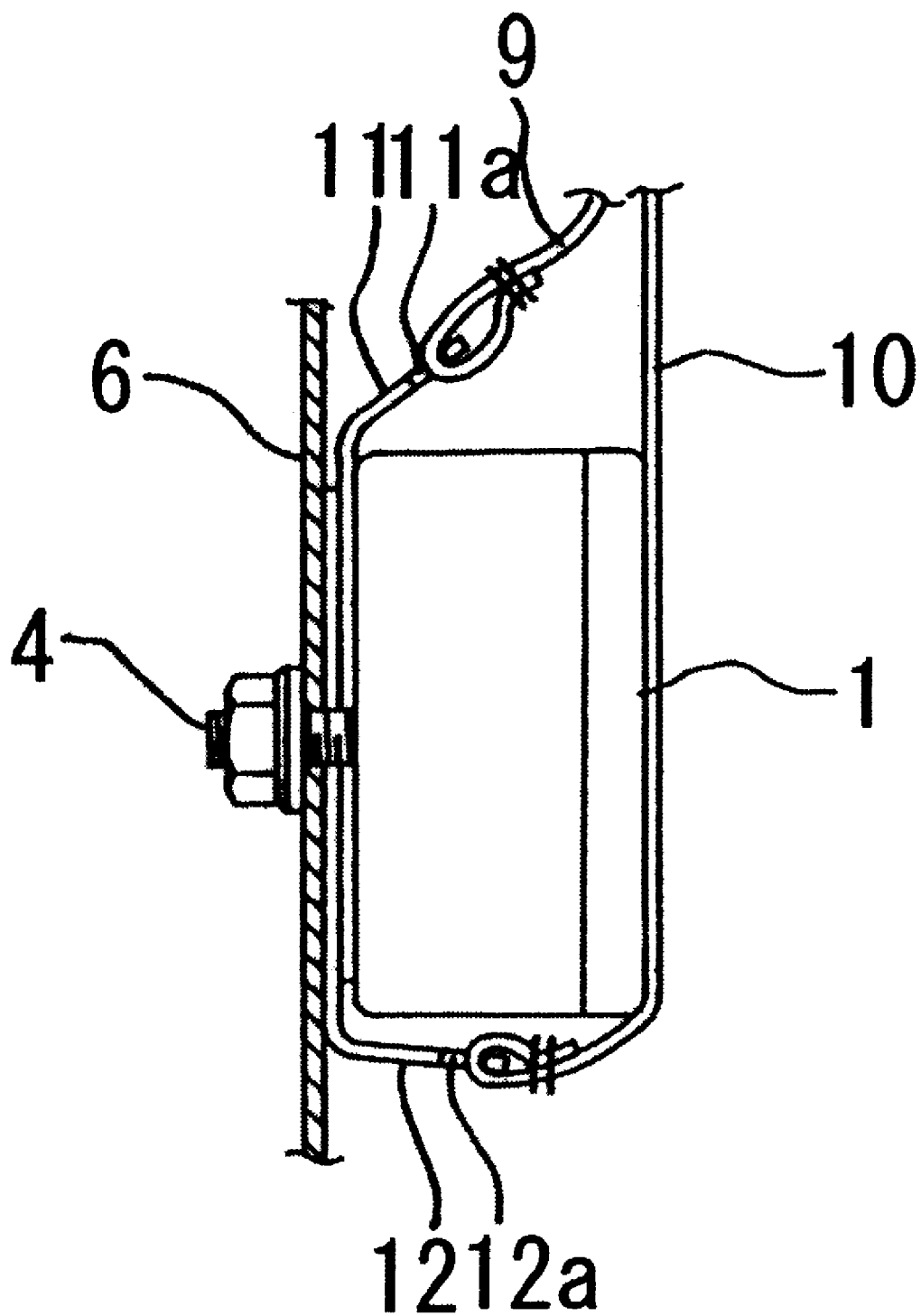
FIG. 4 is a view to mainly explain an air bag system and a stay cloth in the seat back shown in FIG. 2.

Two stay clothes 9 and 10 are installed inside the trim cover 7 by overlapping and sewing one end portion thereof with the sewing portion forming the breaking portion 8 as shown in FIG. 3. The stay clothes 9 and 10 are formed by employing a material such as a polyester nonwoven fabric, a cotton fabric or the like which is a little extended due to the inflating pressure of the air bag.

The structure mentioned above is set to a basic aspect (hereinafter, the common structure portions are described by using the same reference numerals). A first embodiment is formed by wear plates 11 and 12 provided to end portions of the stay clothes 9 and 10. A trim code, a resin plate or the like may used as the wear plates 11 and 12.

These wear plates 11 and 12 are respectively formed of plate portions having slits 11a and 12a through which the stay clothes 9 and 10 are passed, and plate portions having insertion holes 11b, 11c, 12b and 12c for inserting two fastening bolts 4 for fastening and fixing the air bag system 1 to the side plate 6 of the seat back plate 5. The wear plates 11 and 12 are connected with the stay clothes 9 and 10 in the manner that these stay clothes are sewed together in a state that their end portions are passed through the slits 11a and 12a, and are relatively folded.

In order to assemble the seat back B so as to be provided with the respective elements, insertion holes 11b, 11c and insertion holes 12b, 12c for inserting the fastening the fastening bolt 4 are overlapped each other, the fastening bolt 4 of the air bag system 1 is inserted to the bolt insertion holes 11b, 12b, 11c, 12c and the wear plates 11, 12 are previously assembled in the back portion of the air bag system 1 at a time of covering the trim cover 7 over the back pad 2. Together therewith, the stay clothes 9 and 10 are separated into two directions from the sewing portion forming the breaking portion 8 of the trim cover 7, one stay cloth 9 is taken to the side portion of the air bag system 1 and the other stay cloth 10 is taken from the front side of the air bag system 1 to the back portion thereof, whereby the air bag system 1 is wrapped.

In this assembling state, the air bag system 1 is accommodated in the cavity 3 of the back pad 2 together with the stay clothes 9, 10, and the air bag system 1 is applied to a plate surface of the side plate 6 in such a manner as to grip the wear plates 11, 12 between the air bag system 1 and the side plate 6 so as to be mounted and fixed to the side plate 6 by the fastening bolt 4, whereby one stay cloth 9 is taken into the cavity 3 from the opening edge of the back pad 2 while the other stay cloth 10 is taken into the cavity 3 of the back pad 2 from the front portion of the air bag system 1, and thereby, the air bag system 1 is wrapped with two stay clothes 9 and 10. Further, these stay clothes 9 and 10 are connected and supported by the wear plates 11 and 12 which grip and fix the take-in ends of each of the clothes 9, 10 between the air bag system 1 and the side plate 6.

In a seat for a vehicle which is provided with the side air bag system structured in this manner, since the air bag system 1 is directly wrapped inside the stay clothes 9 and 10 so as to be mounted and installed in the side plate 6 of the seat back frame 5, an inflating pressure of the air bag can be directly received by the stay clothes 9 and 10 so as to be efficiently concentrated on the breaking portion 8 of the trim cover 7, thereby quickly breaking the breaking portion 8 of the trim cover 7 and assembling the breaking portion 8 of the trim cover 7 so as to be securely broken by an inflating pressure of the air bag.

In addition, the wear plates 11 and 12 are attached to end portions of the stay clothes 9 and 10, respectively, and thereby, it is possible to simply and securely taken in the end portions of the stay clothes 9 and 10, and thus, to fix these stay clothes to the side plate 6 of the seat back frame 5. Moreover, the end portions of the stay clothes 9 and 10 are not directly fixed by the fastening bolt 4, and thereby, it is possible to prevent the stay clothes 9 and 10 from being broken from a fastening portion by an inflating pressure of air bag.

Figure 5:
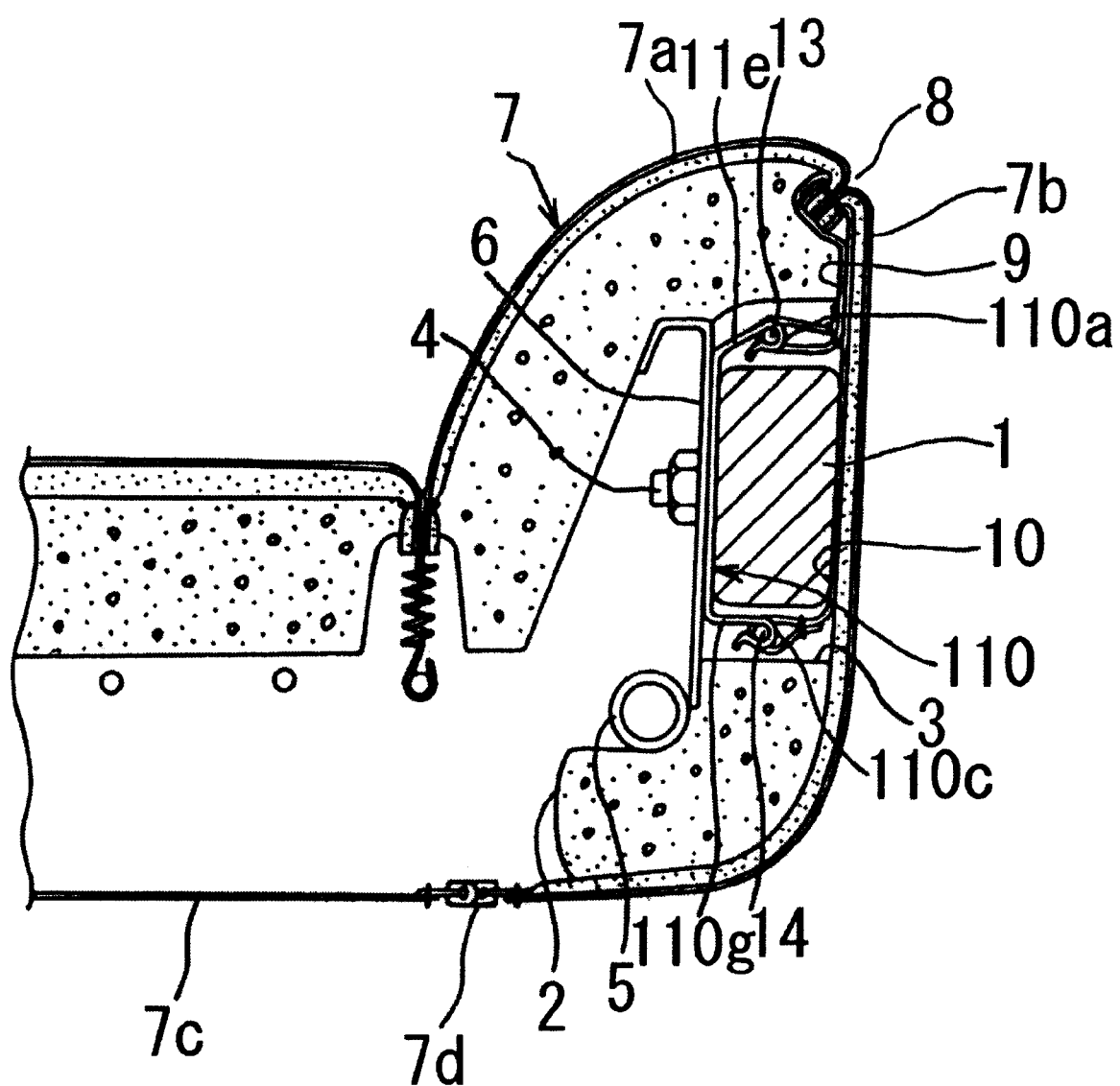
FIG. 5 is a cross sectional view showing a side portion of a seat back which is assembled including a wear plate for connecting a stay cloth according to a second embodiment as a seat with a side air bag system of the present invention.

According to a second embodiment, there is provided one wear plate 110 as shown in FIG. 5. The stay clothes 9 and 10 is separated into two directions from the sewing portion corresponding to the breaking portion 8 of the trim cover 7, and then, one stay cloth 9 is taken into the cavity 3 from an opening edge of the back pad 2, the other stay cloth 10 is taken into the cavity 3 of the back pad 2 from the front side portion of the air bag system 1. In this manner, a seat back is assembled by connecting the take-in end portions to the wear plate 110.

Figure 6:
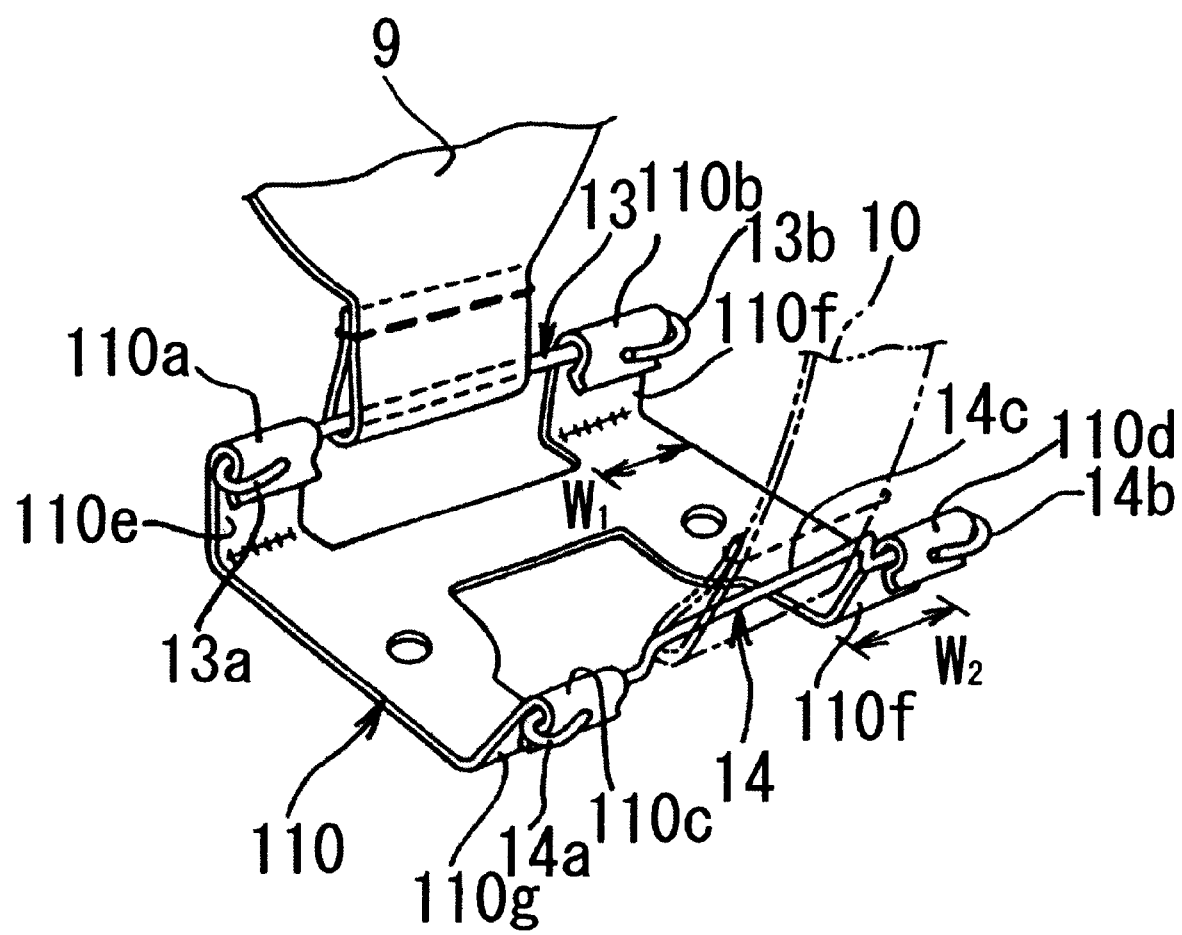
FIG. 6 is a perspective view mainly showing a wear plate for connecting a stay cloth, assembled into the seat back shown in FIG. 5.
Figure 7:
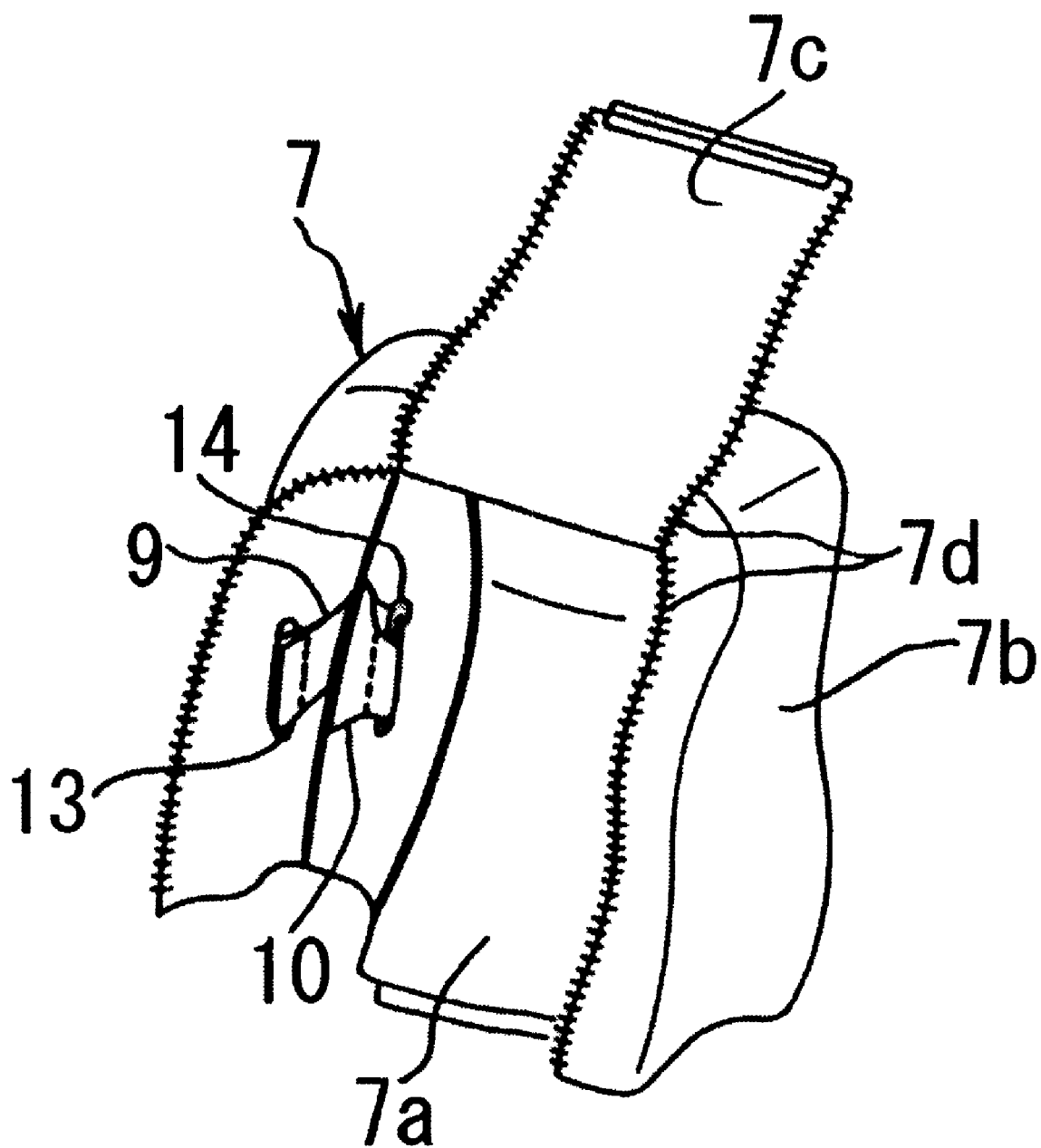
FIG. 7 is a perspective view showing a back side of a trim cover for the seat back shown in FIG. 5.

As shown in FIG. 6, the wear plate 110 is formed with hooks 110a, 110b, 110c and 110d at its both side portions. The stay clothes 9 and 10 are respectively provided with engaging wires 13 and 14 as shown in FIG. 7 at their other end portions extending from the breaking portion 8 of the trim cover 7.

In order to assemble the seat back B including the above elements, the wear plate 110 is gripped between the air bag system 1 and the side plate 6 so that the engaging hooks 110a, 110b, 110c and 110d are positioned on the front and rear sides of the air bag system 1, and then, is previously mounted and fixed to the side plate 6 of the seat back frame 5 by the fastening bolt 4 together with the air bag system 1. In the case of covering the back pad 2 with the trim cover 7 including the stay clothes 9 and 10 inside, one stay cloth 9 is taken into the cavity 3 from an opening edge of the back pad 2, and the other stay cloth 10 is taken into the cavity 3 from the front side portion of the air bag system 1, and thus, the engaging wires 13 and 14 of the take-in ends are engaged with the engaging hooks 110a and 11b and the hooks 110c and 110d, respectively.

In a seat with a side air bag system having the above construction, the stay clothes 9 and 10 can be easily assembled so as to wrap the air bag system 1 therein, and similarly to the above first embodiment, the air bag system 1 is directly wrapped in the stay clothes 9 and 10 so that an inflating pressure of air bag is effectively concentrated on the sewing portion corresponding to the breaking portion 8 of the trim cover 7. Therefore, the seat is assembled so that the air bag can be speedily inflated and developed.

Figure 8:
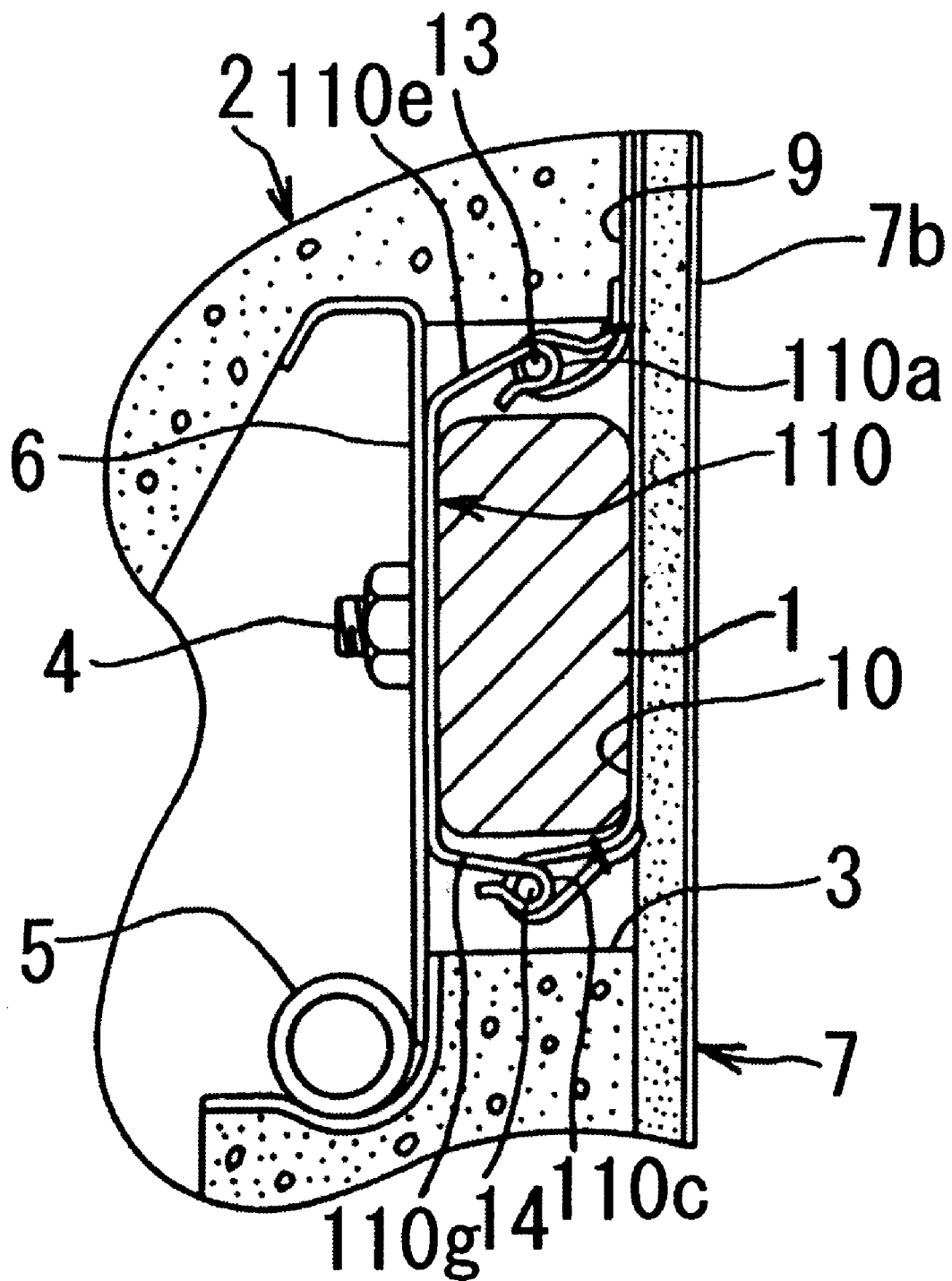
FIG. 8 is a cross sectional view showing a portion equipped with an air bag system in the seat back shown in FIG. 5.

In order to assemble the wear plate 110 into the seat back, as shown in FIG. 6 and FIG. 8, the wear plate 110 is provided with engaging hooks 110a, 110b, 110c and 110d which are formed by bending standing portions 110e, 110f, 110g and 110h. Whereby it is possible to readily engage the engaging wires 13 and 14 having the take-in ends of the stay clothes 9 and 10 with these engaging hooks 110a, 110b, 110c and 110d.

These standing portions 110e, 110f, 110g and 110h are preferably formed having a predetermined width W1, W2 so as to be flexibly deformable by an inflating pressure of air bag. Moreover, these standing portions 110e, 110f, 110g and 110h are flexibly deformed outwardly by an inflating pressure of air bag, and thereby, the wear plate 110 can be assembled so as not to hinder an operation when the air bag can be inflated and developed.

Figure 9:
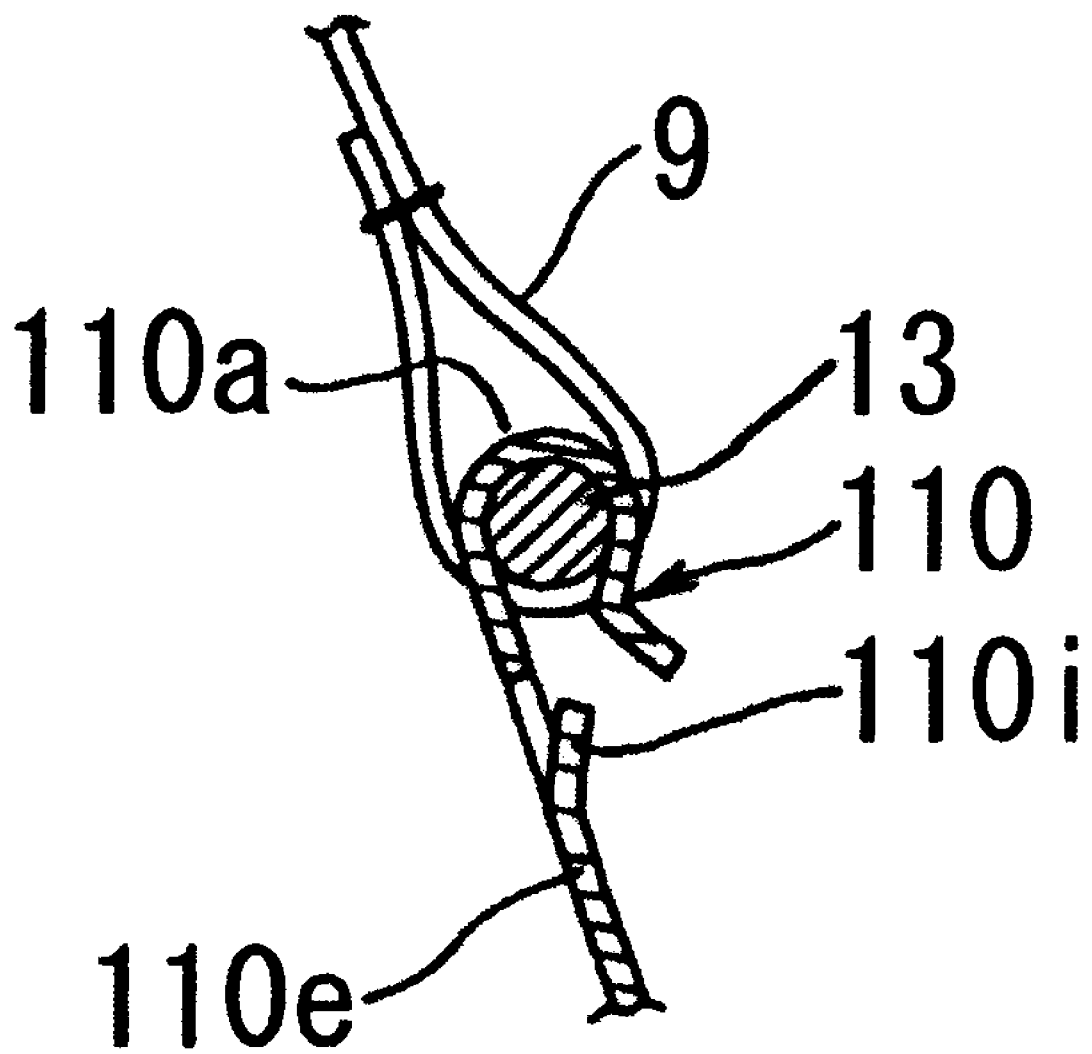
FIG. 9 is a cross sectional view showing a wear plate which is provided with having a reverse pawl-like protrusion capable of being assembled into the seat back shown in FIG. 5.

Further, in the wear plate 110, as shown in FIG. 9, the standing portion 110e is preferably provided with a reverse pawl-like protrusion 110i which approaches an opening of the engaging hook 110a (only one is shown in FIG. 9), and is inclined to a direction making narrow the opening. Whereby the engaging wire 13 having the take-in end of the stay clothes 9 can be securely engaged with the hook 110a without coming off the engaging hook 110a.

The engaging wires 13 and 14 are mounted by winding each end portion of the stay clothes 9 and 10 around an axial line of each wire, and by sewing the end portion. A steel wire material is used as the engaging wires 13 and 14. Moreover, the engaging wires 13 and 14 are formed with U-shaped bent portion 13a and 13b, and U-shaped bent portions 14a and 14b at their both end portions, respectively. These U-shaped bent portion 13a, 13b, 14a and 14b are formed so as to be extended into an upper sides of the hooks 110a, 110b, 110c and 110d. By doing so, it is possible not only to prevent damage of the back pad 2, and but also to prevent the engaging wires 13 and 14 from coming off by a tension of the stay clothes 9 and 10.

Moreover, the engaging wire 14 is provided with an engaging axial portion 14c for the stay cloth 10, which is formed higher than an axial portion engaging with the hooks 110c and 110d. By using the engaging wire 14 as described above, it is possible to securely fix the longer stay cloth 10 taken into the cavity 3 of the back pad 2 from the front side portion of the air bag system 1 without a lateral shift. In this case, the shorter stay cloth 9 taken into the cavity 3 from the opening edge of the back pad 2 is hard to cause a lateral shift; therefore, the stay cloth 9 can be fixed by a usual linear wire 13.

Figure 10:
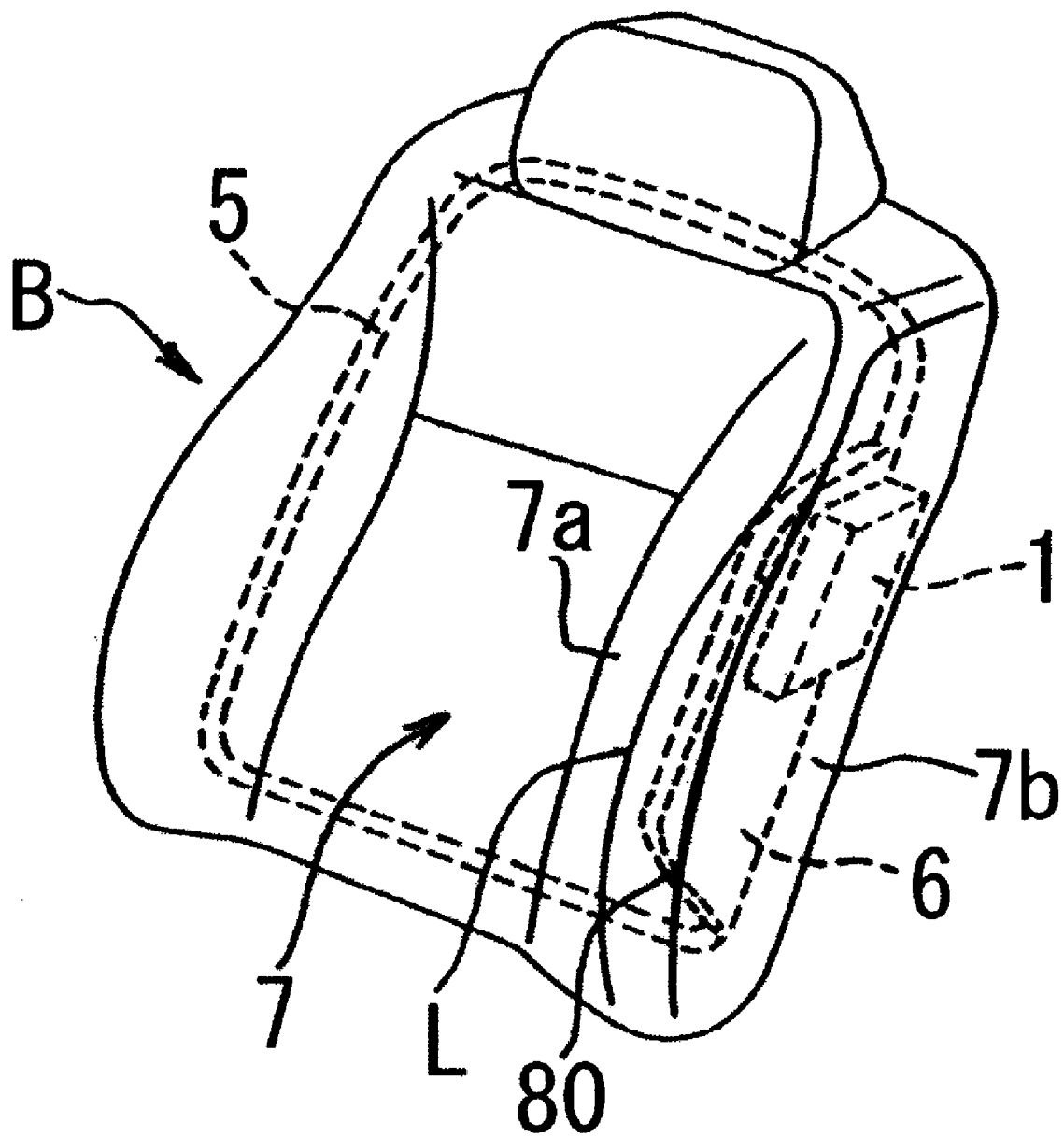
FIG. 10 is a perspective view a seat back which is assembled including a trim cover having a breaking portion according to another embodiment as a seat with a side air bag system of the present invention.
Figure 11:
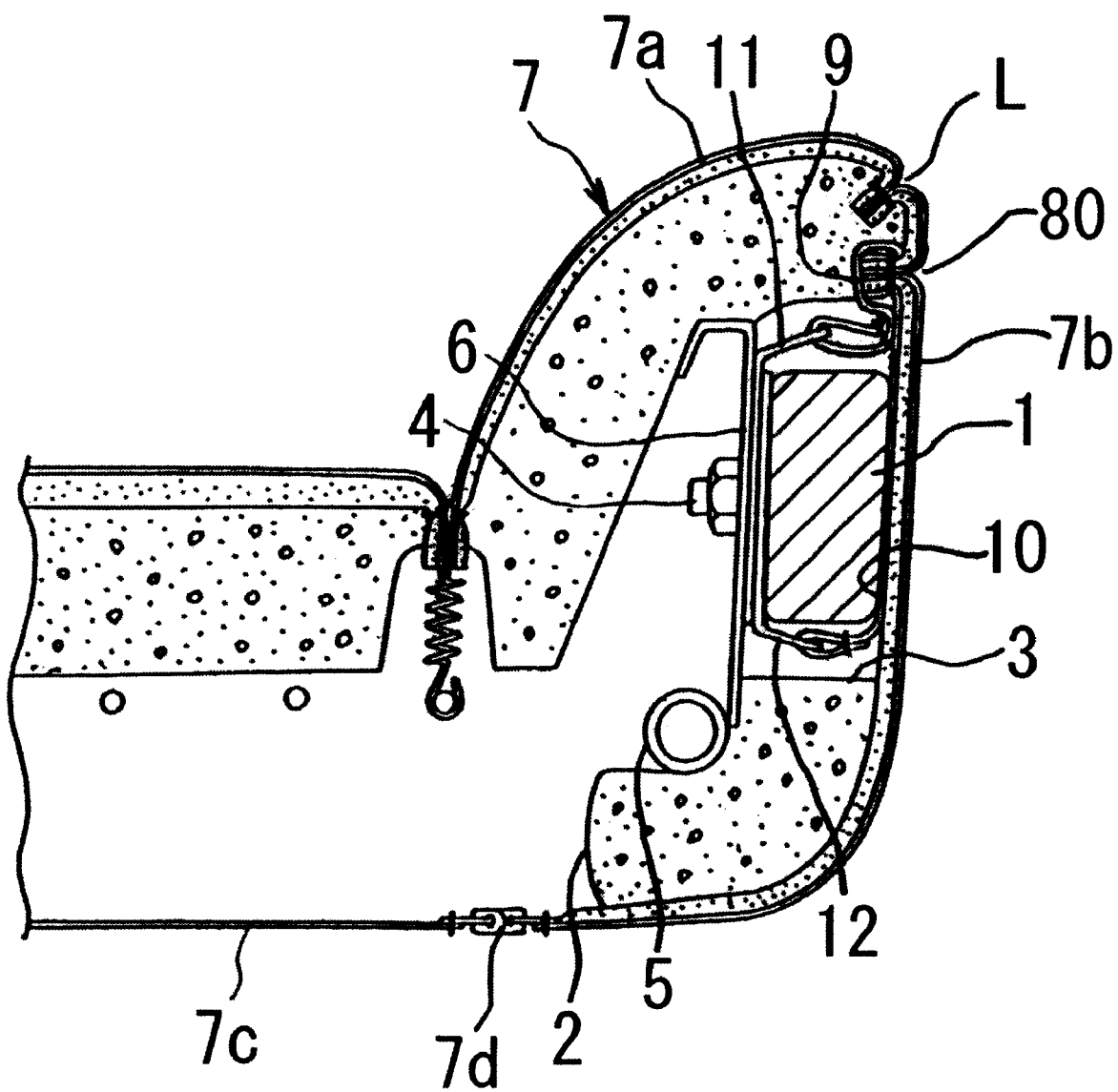
FIG. 11 is a cross sectional view showing a side portion of the seat back shown in FIG. 10.

As the breaking portion of the trim cover 7, in place of the embodiment mentioned above, the structure can be made such that a whole structure thereof is made substantially in parallel to a sewing portion L between the front surface cover portion 7a and the side surface cover portion 7b which are sewed so as to form a bag shape as shown in FIG. 10 and a sewing portion corresponding a breaking portion 80 of the trim cover 7 is provided within an area of the side surface cover portion 7b so as to be closer to the installing position of the air bag system 1 as shown in FIG. 11. The sewing portion corresponding to the breaking portion 80 can be formed by shaping and cutting the side surface cover portion 7b into two sheets comprising front and rear portions and sewing the sheets to each other.

Accordingly, it is possible to further quickly cut the sewing portion corresponding to the breaking portion 80 of the trim cover 7 so as to assemble the air bag so that the air bag can quickly inflate and develop, the stay clothes 9 and 10 can be assembled with a short necessary length, and it is possible to obtain a splendid appearance due to a double stitch structure of the sewing portion L between the front surface cover portion 7a and the side surface cover portion 7b which are wholly sewed so as to form a bag shape and the sewing portion corresponding to the breaking portion 80 of the trim cover 7.

As mentioned above, the seat provided with the side air bag system according to the present invention is useful since the stay clothes are easily assembled so as to wrap the air bag system and the stay clothes are provided in such a manner as to wrap the air bag system by the stay clothes and concentrate the inflating pressure of the air bag on the sewing portion corresponding to a breaking portion of a trim cover, thereby quickly inflating and developing the air bag.

What is claimed is:

1. A seat provided with a side air bag system comprising:
   an air bag system installed so as to be capable of inflating and developing an air bag outward due to a gas pressure, and being positioned within a cavity provided in a side portion of a back pad so as to be mounted to a side plate of a seat back frame;
   a trim cover covering a deployment side of the air bag system, said trim cover having a breaking portion that is adapted to rupture during inflation and development of the air bag;
   first and second stay cloths each having a first end portion and a second end portion, said first end portion thereof being attached to the trim cover, said stay cloths being provided inside the trim cover; and
   a wear plate connected to the second end portions of the first and second stay cloths, respectively, said wear plate being gripped and fixed between the air bag system and the side plate;
   wherein said first stay cloth extends into the cavity on one side of the air bag system and the said second stay cloth extends into the cavity on the other side the air bag system so that the air bag system is wrapped with the first and second stay cloths in combination with the wear plate.

2. The seat with a side air bag system according to claim 1, wherein the wear plate comprises first and second side portions adapted for attaching the second end portions of the stay cloths thereto and a mounting portion adapted to receive a fastener for attaching said wear plate to the side plate and said air bag system.

3. The seat with a side air bag system according to claim 1, wherein the wear plate is formed with engaging hooks at its both side ends, a engaging wire engaging with the hooks is provided at the other end portion of each stay cloth extending from a breaking portion of a trim cover, the engaging hook is positioned on front and rear sides of the air bag system so that the wear plate is gripped and fixed between the air bag system and the side plate, one stay cloth is taken into a cavity from an opening edge of the back pad while the other stay cloth is taken into the cavity of the back pad from a front side portion of the air bag system so that the air bag system is directly wrapped with two stay clothes, and the take-in end of each stay cloth is connected to the wear plate by the engaging wire engaging with the engaging hooks so that the air bag system is directly wrapped with two stay clothes.

4. The seat with a side air bag system according to claim 3, wherein the wear plate is provided with an engaging hook which is bent from a standing portion flexibly deformable by an inflating pressure of the air bag and having a predetermined width.

5. The seat with a side air bag system according to claim 3 or 4, wherein the wear plate is further provided with a reverse pawl-like protrusion which is inclined to a direction making narrow an opening of the engaging hook.

6. The seat with a side air bag system according to claim 3, wherein the engaging wire has U-shaped bent portions which are formed so as to be extended into upper sides of the hooks at its both axial side ends.

7. The seat with a side air bag system according to claim 3 or 6, wherein the engaging wire has a stay cloth fixing axial portion which is formed higher than a portion engaging with the hook.

8. A seat provided with a side air bag system according to any one of claims 1 to 4, wherein the breaking portion of the trim cover comprises a sewing portion located between a front surface cover portion and a side surface cover portion of the trim cover, said front surface cover portion and said side surface cover portion being sewed together so as to form a bag shape, said sewing portion corresponding to the breaking portion of the trim cover, and the first end portion of each of the stay cloths is sewed to the sewing portion.

* * * * *